(12) United States Patent
Chen

(10) Patent No.: US 8,210,719 B2
(45) Date of Patent: Jul. 3, 2012

(54) SOLAR LED INDICATOR FOR ROAD RAILINGS

(76) Inventor: Jianguo Chen, Ningbo (CN)

( * ) Notice: Subject to any disclaimer, the term of this patent is extended or adjusted under 35 U.S.C. 154(b) by 0 days.

(21) Appl. No.: 13/045,554

(22) Filed: Mar. 11, 2011

(65) Prior Publication Data

US 2011/0157880 A1 Jun. 30, 2011

Related U.S. Application Data

(63) Continuation of application No. PCT/CN2009/000996, filed on Sep. 2, 2009.

(30) Foreign Application Priority Data

Sep. 11, 2008 (CN) .......................... 2008 2 0136518

(51) Int. Cl.
*F21V 23/04* (2006.01)
(52) U.S. Cl. .................. 362/276; 362/183; 362/249.02; 362/802

(58) Field of Classification Search ............ 362/183, 362/249.02, 276, 295, 802
See application file for complete search history.

(56) References Cited

U.S. PATENT DOCUMENTS 7,419,283 B2 * 9/2008 Von Ronn et al. ............ 362/401

* cited by examiner

*Primary Examiner* — Jason Moon Han
(74) *Attorney, Agent, or Firm* — Matthias Scholl P.C.; Matthias Scholl

(57) ABSTRACT

A solar LED indicator for use on road railings including a base, a lamp holder, a solar panel, an LED, a rechargeable battery, and a control panel. The base is S-shaped and on the top thereof disposed is the solar panel. The lamp holder comprises a chamber and is disposed at the concave side of the base. The LED is disposed at least at one side of the lamp holder. The rechargeable battery and the control panel are disposed in the chamber of the lamp holder, the rechargeable battery is connected with the solar panel, and the control panel controls the working conditions of the LED. The solar LED indicator can be seen from a long distance and exhibits a good guiding effect.

17 Claims, 6 Drawing Sheets

SOLAR LED INDICATOR FOR ROAD RAILINGS

CROSS-REFERENCE TO RELATED APPLICATIONS

This application is a continuation of International Patent Application No. PCT/CN2009/000996 with an international filing date of Sep. 2, 2009, designating the United States, now pending, and further claims priority benefits to Chinese Patent Application No. 200820136518.8 filed Sep. 11, 2008. The contents of all of the aforementioned applications, including any intervening amendments thereto, are incorporated herein by reference.

BACKGROUND OF THE INVENTION

1. Field of the Invention

The invention relates to a road indicating device, and more particularly to a solar LED indicator.

2. Description of the Related Art

Conventional road indicators are a certain reflective sheet disposed on road railings (two-wave plates or three-wave plates). The reflective sheet reflects light from headlights and thus guides the drivers, with advantages of simple structure, low cost, and zero energy consumption. However, the reflection is passive and requires bright light. If the headlight is damaged or the weather is bad, for example, in a raining or foggy day, the reflection effect will be poor. Furthermore, because the irradiation distance of the headlight has a limit, the reflective sheet can only guide for a short distance, for long distance guidance, particularly for corner guidance, it is not practicable.

CN Pat. Pub. No. 2659949Y discloses a traffic sign including an indicating board and a support pole. Guide signs made of transparent reflective materials are written on the indicating board. Optionally, an LED is disposed around the guide sign. The support pole is made of an elastic material or two rigid rods linked by an elastomer. The elastomer is disposed at the lower part of the support pole. The traffic sign has good reflection and light effect and good collision resistance, but can only be used at road junctions.

SUMMARY OF THE INVENTION

In view of the above-described problems, it is one objective of the invention to provide a solar LED indicator that features long guidance distance and good guidance effect.

To achieve the above objective, in accordance with one embodiment of the invention, there is provided a solar LED indicator disposed on road railings, the solar LED indicator comprising a base, a lamp holder, a solar panel, an LED, a rechargeable battery, and a control panel, wherein the base is S-shaped and on the top thereof disposed is the solar panel; the lamp holder comprises a chamber and is disposed at the concave of the base; the LED is disposed at least at one side of the lamp holder; the rechargeable battery and control panel are disposed in the chamber of the lamp holder and, the rechargeable battery is connected with the solar panel and the control panel controls the working conditions of the LED.

The base is designed as S-shaped so as to cooperate with the bending of the road railings. Thus, the lamp holder and the solar panel are exactly positioned at the concave of the road railings, thereby achieving a protection effect. In the daytime, the rechargeable battery is charged via the solar panel. The LED is disposed at least at one side of the lamp holder and the working conditions thereof are controlled by the control panel. In the daytime the LED does not work but at night, the LED works to guide drivers, which not only saves electric energy but also prolongs the service life of the LED. The LED has strong luminous intensity and the irradiation thereof is active. Thus, no matter the road is straight or winding, it is raining or foggy, even if the headlight is damaged and the road is long, the solar LED indicator still works to guide the drivers.

In a class of this embodiment, the lamp holder comprises a trapezoidal incline at both sides thereof. At the middle of one side of the trapezoidal incline disposed is the LED. A reflective film is disposed on the trapezoidal incline and around the LED to form a one-way indicator sign, i.e., the light emitted from the LED or reflected by the reflective film is only directed to the coming vehicles. The functions of the reflective film are the same as that of conventional reflective sheets. Thus, even if the LED is damaged, the reflective film still works. Preferably, there is a dip angle between the incline disposed with the LED and reflective film and the normal line of the road railing, so that the light emitted from the LED or reflected by the reflective film is deflected appropriately to the middle of the road.

In a class of this embodiment, the lamp holder comprises a trapezoidal incline at both sides thereof. At the middle of both sides of the trapezoidal incline disposed is the LED. A reflective film is disposed on the trapezoidal incline and around the LED to form a two-way indicator sign whose working principle is the same as that of the above-mentioned one-way indicator sign.

In a class of this embodiment, the S-shaped bending of the base cooperates with the cross-section of a two-wave plate.

In a class of this embodiment, the S-shaped bending of the base cooperates with the cross-section of a three-wave plate.

Conventional road railings are mainly made of two-wave or three-wave plates. Thus, the cooperation between the bending shape of the base and the cross-section of the road railings benefits the installation of the indicator.

In a class of this embodiment, the control panel controls the working conditions of the LED according to the working conditions of the solar panel. The working conditions of the LED comprise luminous intensity and flicker frequency. Although the control panel can control the working conditions of the LED according to working time (for example, turn on/off the LED regularly), the control based on the working conditions of the solar panel is more precise. The working conditions of the solar panel are directly related to the luminous intensity. If the luminous intensity is strong, the output voltage of the solar panel is high. When the luminous intensity decreases, the output voltage of the solar panel decreases greatly. Thus, the control panel can control the working time of the LED according to the output voltage of the solar panel which is determined by the intensity of light on the spot. In addition, the control panel controls the luminous intensity and flicker frequency of the LED according to the working conditions of the solar panel. The lower the intensity of light on the spot, the brighter the LED, and the lower the flicker frequency of the LED, thereby optimizing the resource allocation, reducing the energy consumption and cost, and prolonging the service life of the LED.

In a class of this embodiment, the chamber of the lamp holder comprises two grooves symmetrically, in which the rechargeable battery and control panel are disposed, respectively. Optionally, the grooves are further perfused using a sealant and thus the electronic circuit or device is protected from the influence of external environment, for example, wind or rain, improving the stability of the solar LED indicator.

In a class of this embodiment, a mounting hole is disposed at the center of the lamp holder, and a mounting plate is at the rear of the lamp holder. The mounting plate comprises a plurality of slots. The axis of the mounting hole and the symmetric center line of the slots are in the same plane. The mounting hole and mounting plate separately fixes the LED indicator to the road railings. When the mounting hole is applied, a screw passes through the hole to fix the LED indicator to the road railings. When the mounting plate is applied, the road railings are first disposed with a clamp. Through the cooperation of the clamp and the slots of the mounting plate, the solar LED indicator are fixed to the road railings. That the axis of the mounting hole and the symmetric center line of the slots are in the same plane ensures that, without disassembly of the mounting plate, the mounting hole can be applied directly. Thus, the two installation methods can be applied at random.

In a class of this embodiment, the solar LED indicator can be fixed as follows. A shallow groove is disposed around the base and adhesive stripes or magnetic stripes are installed therein. Thus, the adhesive stripes or magnetic stripes fix the solar LED indicator to the road railings. The installation method is applied alone, or combined with the above-mentioned two methods.

In a class of this embodiment, the base and the lamp holder are symmetrically integrated thin-wall structures, which can be produced in batches using plastic mold or sheet metal pressing, thereby saving materials and reducing production cost.

In a certain embodiments, the solar LED indicator is a road sign.

Advantages of the invention are summarized below. The solar LED indicator has a compact structure, high brightness and reliability, and is controlled intelligently. Thus, the solar LED indicator has a long guidance distance and good guidance effect, thereby greatly reducing the occurrence of traffic accident.

BRIEF DESCRIPTION OF THE DRAWINGS

The invention is described hereinbelow with reference to accompanying drawings, in which.

DETAILED DESCRIPTION OF THE EMBODIMENTS

For further illustrating the invention, experiments detailing a solar LED indicator are described below. It should be noted that the following examples are intended to describe and not to limit the invention.

Embodiment 1

Figure 1:
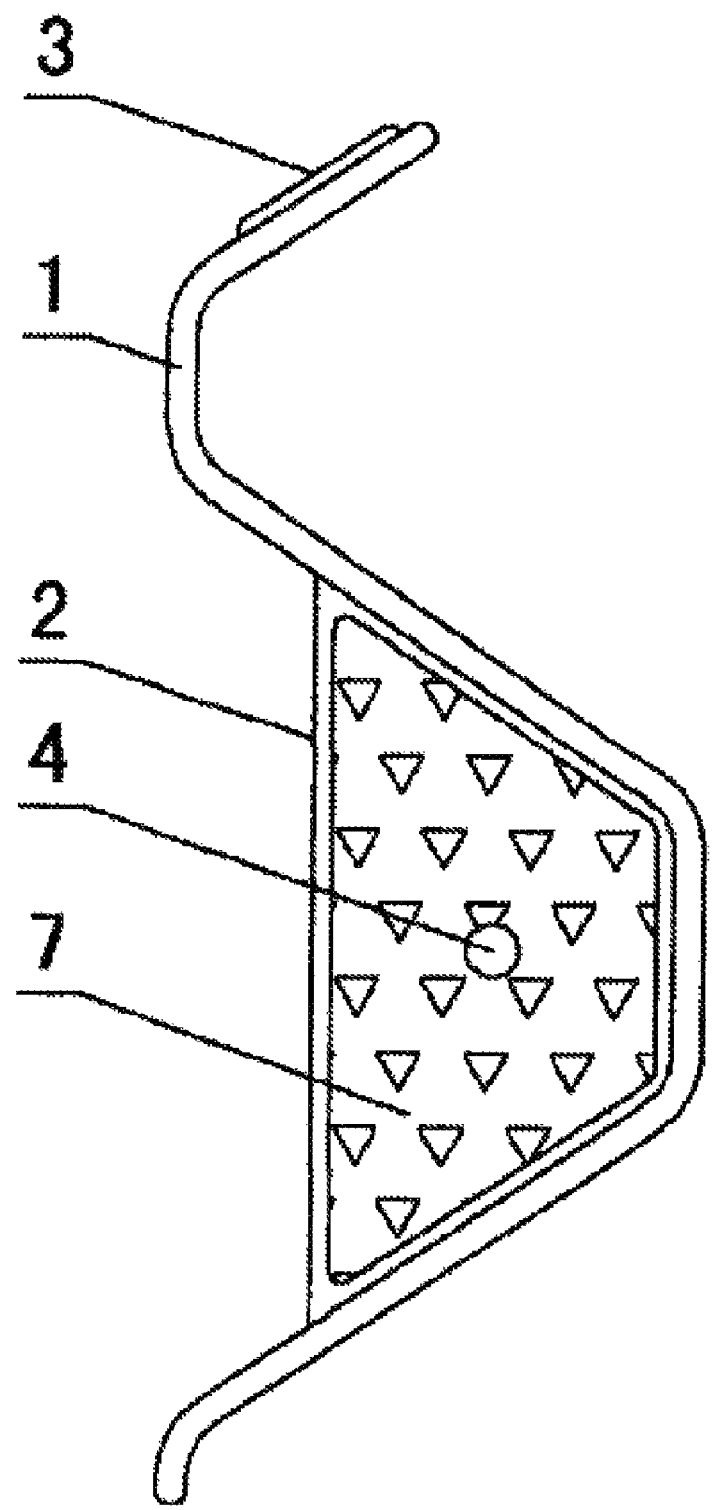
FIG. 1 is a schematic diagram of a solar LED indicator according to one embodiment of the invention.
Figure 2:
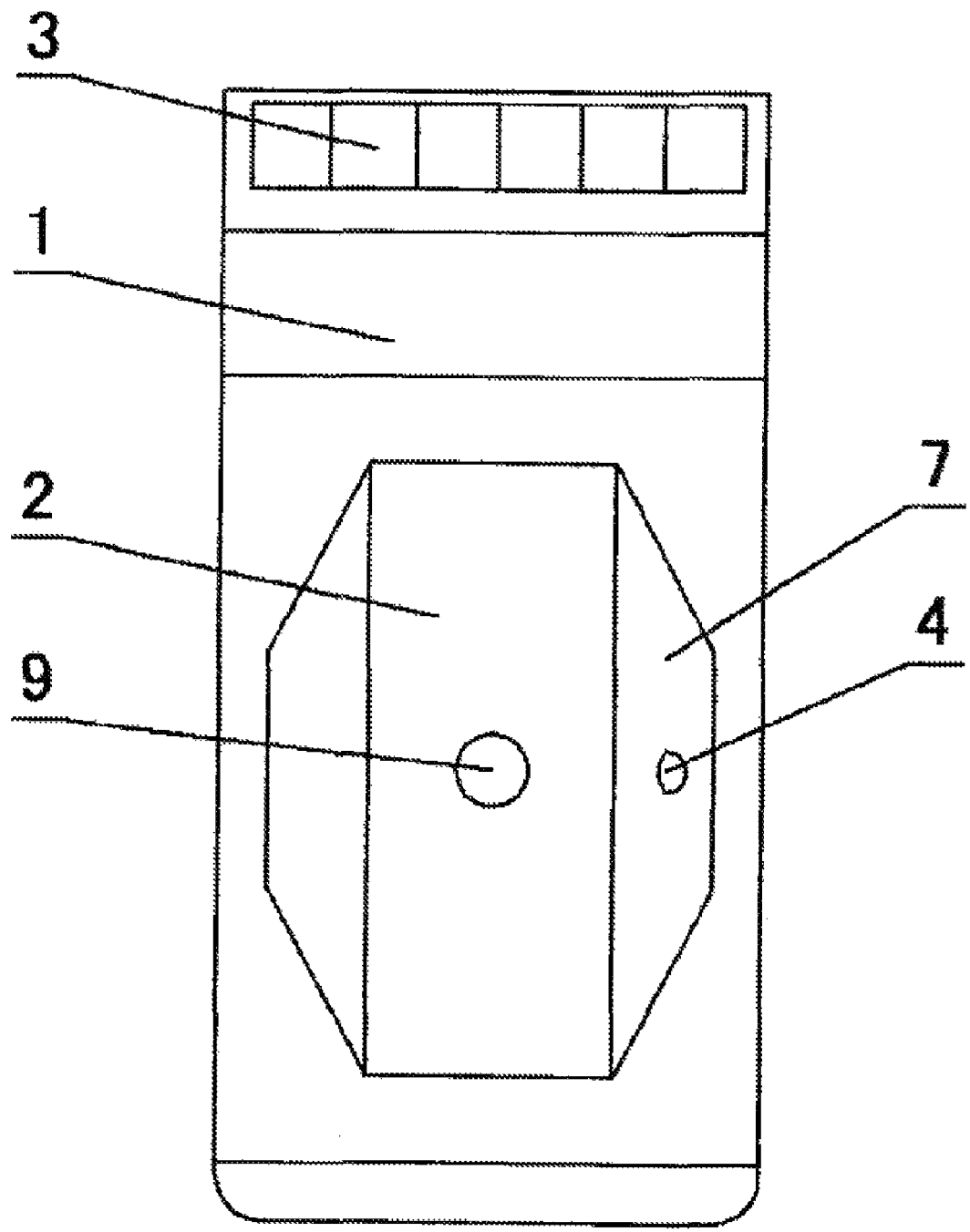
FIG. 2 is a left view of FIG. 1.
Figure 3:
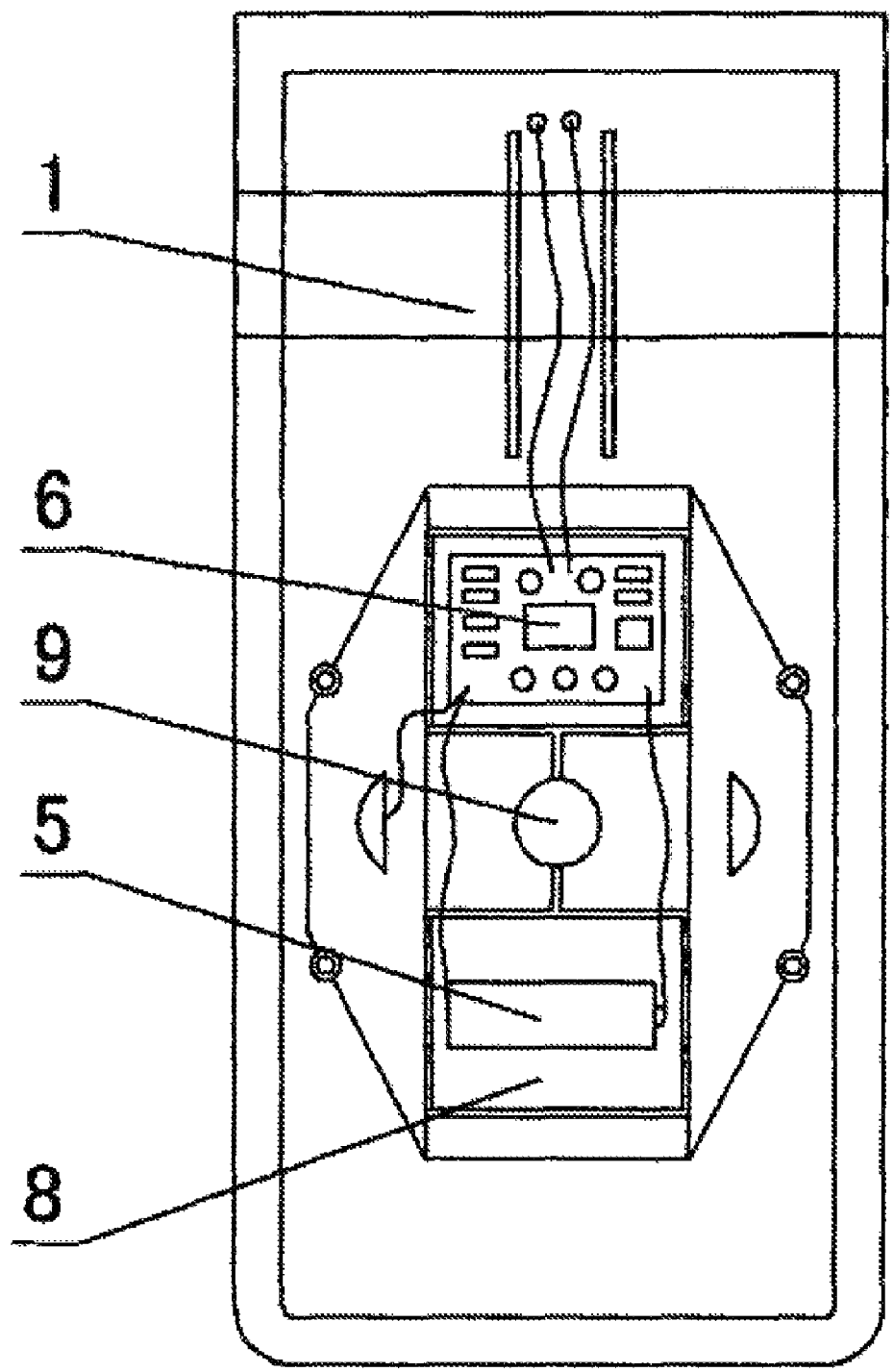
FIG. 3 is a right view of FIG. 1.
Figure 6:
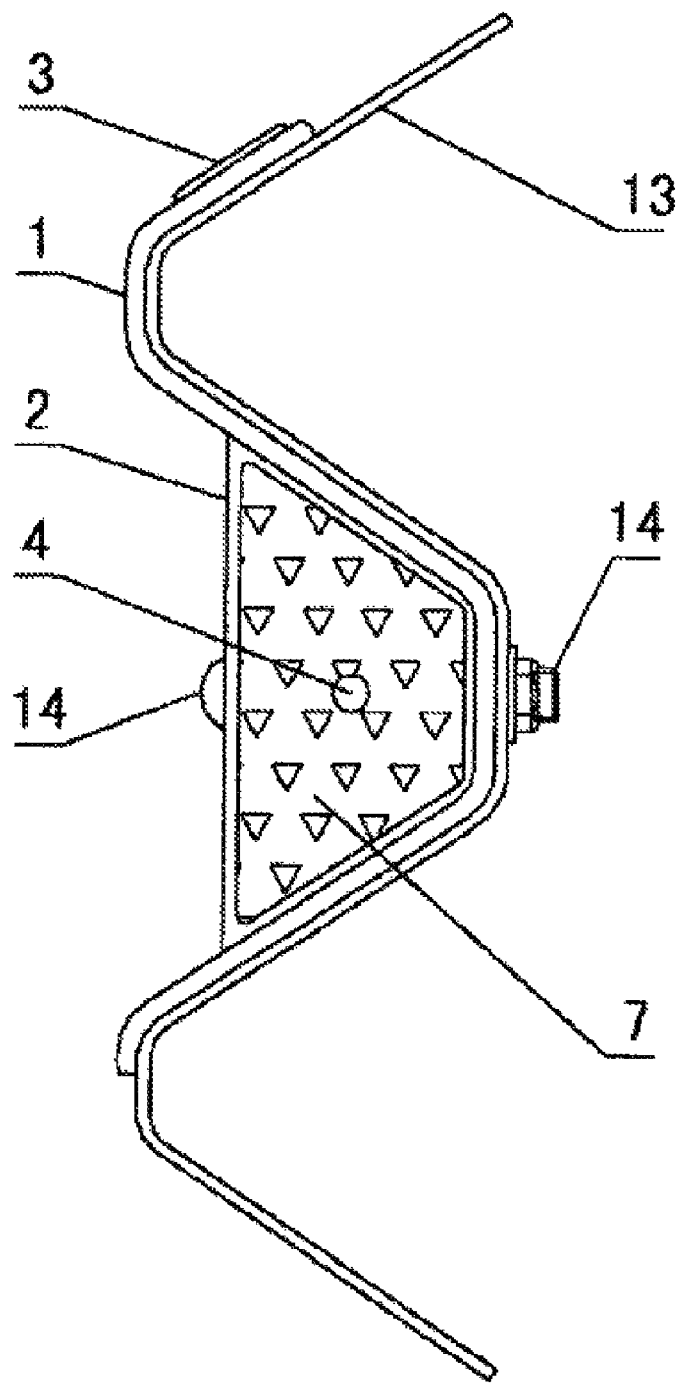
FIG. 6 is an installation diagram of a solar LED indicator according to one embodiment of the invention.

As shown in FIGS. 1 and 2, a solar LED indicator disposed on road railings comprises a base 1, a lamp holder 2, a solar panel 3, an LED 4, a rechargeable battery 5, and a control panel 6. The base 1 is S-shaped and on the top thereof disposed is the solar panel 3. The S-shaped bending of the base 1 cooperates with the cross-section of a two-wave plate 13. The lamp holder 2 comprises a chamber and is disposed at the concave of the base 1. The LED 4 is disposed at least at one side of the lamp holder 2. The rechargeable battery 5 and control panel 6 are disposed in the chamber of the lamp holder 2. The chamber comprises two grooves 8 symmetrically, in which the rechargeable battery 5 and control panel 6 are disposed, respectively (as shown in FIG. 3). All components in the grooves are sealed with an adhesive. The lamp holder 2 comprises a trapezoidal incline at both sides thereof. At the middle of one side of the trapezoidal incline disposed is the LED 4. A reflective film 7 is disposed on the trapezoidal incline and around the LED 4. The rechargeable battery 5 is connected with the solar panel 3. The working conditions of the LED 4 are controlled by the control panel 6 according to the working conditions of the solar panel 3. The working conditions of the LED 4 comprise luminous intensity and flicker frequency. The base 1 and the lamp holder 2 are symmetrically integrated thin-wall structures. The base 1 has relatively thick edges so that the circuit lines in the base 1 are not destroyed when the base 1 is mounted on the road railings. A mounting hole 9 is disposed at the center of the lamp holder 2. A screw 14 passes through the mounting hole 9 to fix the lamp holder 2 to the two-wave plate 13 (as shown in FIG. 6).

Embodiment 2

Figure 4:
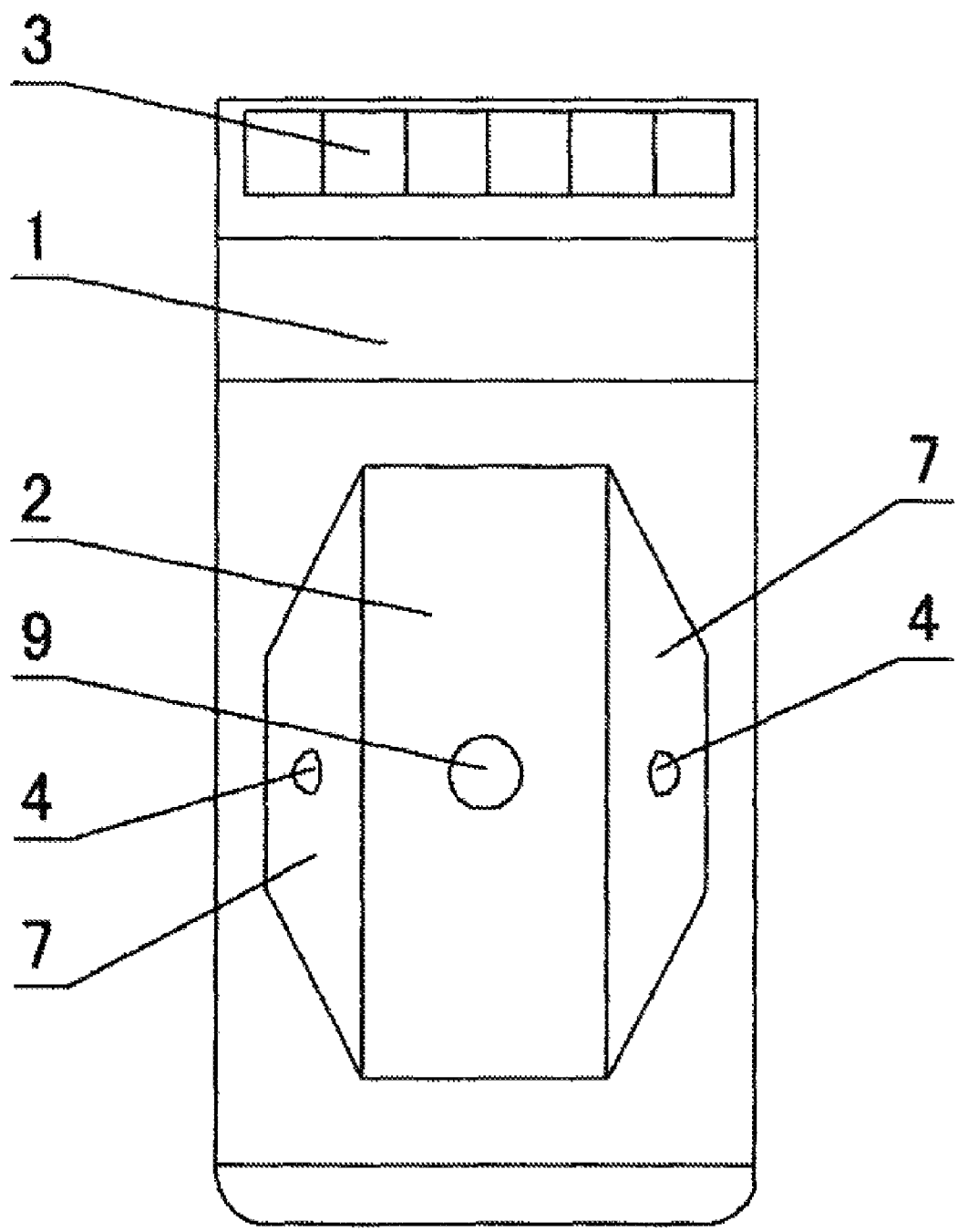
FIG. 4 is a schematic diagram of another solar LED indicator according to one embodiment of the invention.
Figure 5:
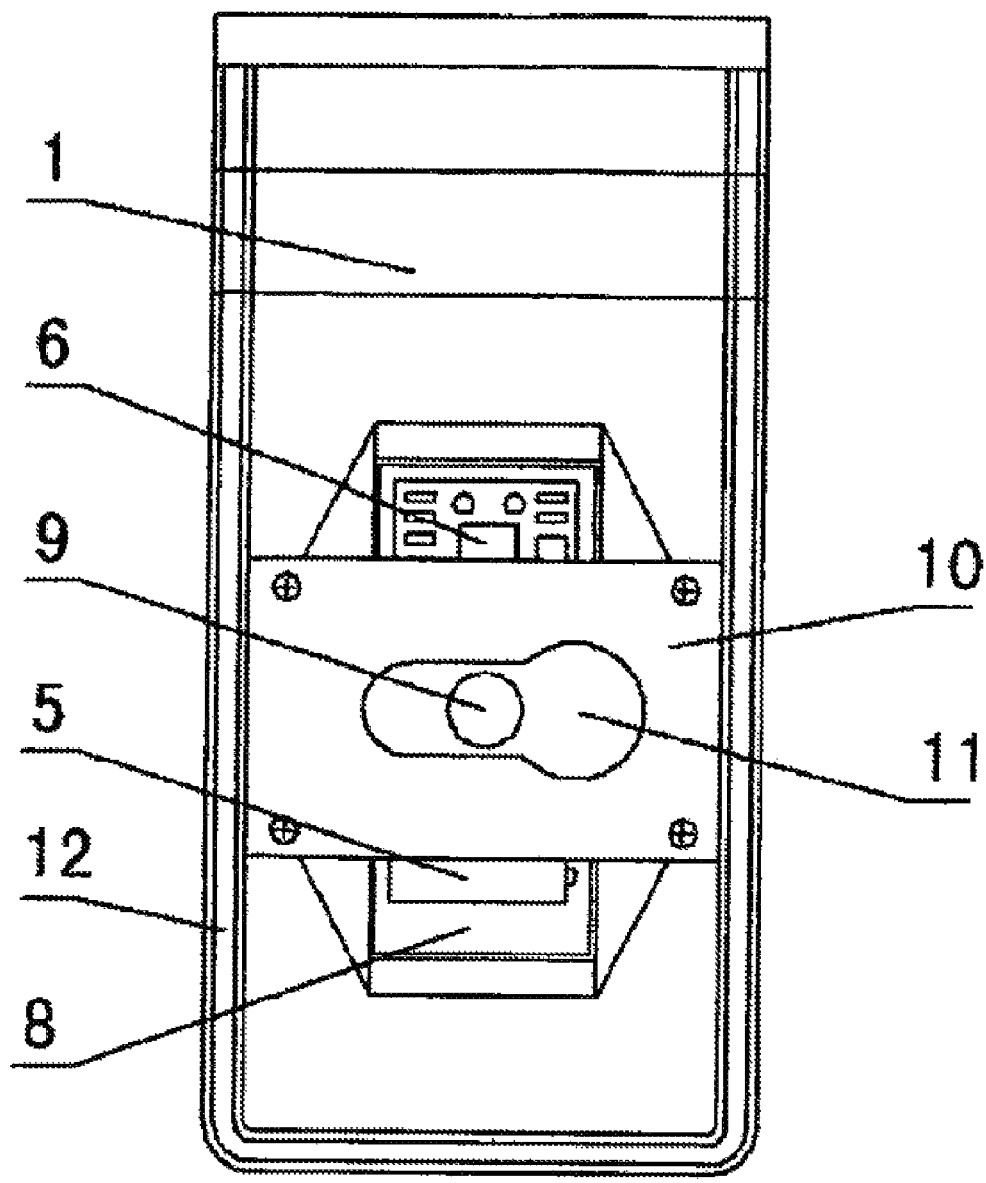
FIG. 5 is a back view of FIG. 4.

As shown in FIGS. 4 and 5, the embodiment is basically the same as the embodiment 1 except the following descriptions. The S-shaped bending of the base 1 cooperates with the cross-section of a three-wave plate. The lamp holder 2 comprises a trapezoidal incline at both sides thereof. At the middle of both sides of the trapezoidal incline disposed is the LED 4. A reflective film 7 is disposed on the trapezoidal incline and around the LED 4. A mounting plate 10 is disposed at the rear of the lamp holder 2. The mounting plate 10 comprises a plurality of slots 11. The axis of the mounting hole 9 and the symmetric center line of the slots 11 are in the same plane. A shallow groove 12 is disposed around the base 1 and adhesive stripes or magnetic stripes are installed therein. Thus, the slots 11 and adhesive stripes or magnetic stripes fix the solar LED indicator to the road railings (three-wave plate).

After the solar LED indicator is mounted to the road railings, in the daytime, due to high intensity of sunlight, the output voltage of the solar panel is very high. Thus, the solar panel recharges the rechargeable battery to save energy, and the control panel controls the LED not to work. When the intensity of sunlight decreases and the indicator is required, the control panel controls the LED to work in a manner of flickering. The luminous intensity and flicker frequency of the LED is controlled according to the light intensity on the spot. The lower the light intensity on the spot, the brighter the LED, and the lower the flicker frequency of the LED, thereby optimizing the resource allocation, reducing the energy consumption and cost, and prolonging the service life of the LED. The LED has strong luminous intensity and the irradiation thereof is active. Thus, no matter the road is straight or winding, it is raining or foggy, even if the headlight is damaged and the road is long, the solar LED indicator still works to guide the drivers.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A solar LED indicator for use on road railings, the solar LED indicator comprising
   a) a base having a concave portion,
   b) a lamp holder,
   c) a solar panel,
   d) an LED,
   e) a rechargeable battery, and
   f) a control panel,
   wherein
   the base is S-shaped and on the top thereof disposed is the solar panel;
   the lamp holder comprises a chamber and is disposed at the concave portion of the base;
   the LED is disposed at least at one side of the lamp holder;
   the rechargeable battery and the control panel are disposed in the chamber of the lamp holder;
   the rechargeable battery is connected with the solar panel; and
   the control panel controls the working conditions of the LED.

2. The solar LED indicator of claim 1, wherein the lamp holder comprises a trapezoidal incline at both sides thereof; at the middle of one side of the trapezoidal incline disposed is the LED; and a reflective film is disposed on the trapezoidal incline and around the LED.

3. The solar LED indicator of claim 1, wherein the lamp holder comprises a trapezoidal incline at both sides thereof; at the middle of both sides of the trapezoidal incline disposed is the LED; and a reflective film is disposed on the trapezoidal incline and around the LED.

4. The solar LED indicator of claim 1, wherein the S-shaped bending of the base cooperates with the cross-section of a two-wave plate.

5. The solar LED indicator of claim 1, wherein the S-shaped bending of the base cooperates with the cross-section of a three-wave plate.

6. The solar LED indicator of claim 1, wherein the control panel controls the working conditions of the LED according to the working conditions of the solar panel, and the working conditions of the LED comprise luminous intensity and flicker frequency.

7. The solar LED indicator of claim 1, wherein the chamber of the lamp holder comprises two grooves symmetrically, in which the rechargeable battery and control panel are disposed, respectively.

8. The solar LED indicator of claim 1, wherein a mounting hole is disposed at the center of the lamp holder, and a mounting plate is at the rear of the lamp holder; the mounting plate comprises a plurality of slots; and the axis of the mounting hole and the symmetric center line of the slots are in the same plane.

9. The solar LED indicator of claim 1, wherein a shallow groove is disposed around the base and adhesive stripes or magnetic stripes are installed therein.

10. The solar LED indicator of claim 1, wherein the base and the lamp holder are symmetrically integrated thin-wall structures.

11. The solar LED indicator of claim 2, wherein the base and the lamp holder are symmetrically integrated thin-wall structures.

12. The solar LED indicator of claim 3, wherein the base and the lamp holder are symmetrically integrated thin-wall structures.

13. The solar LED indicator of claim 4, wherein the base and the lamp holder are symmetrically integrated thin-wall structures.

14. The solar LED indicator of claim 5, wherein the base and the lamp holder are symmetrically integrated thin-wall structures.

15. The solar LED indicator of claim 6, wherein the base and the lamp holder are symmetrically integrated thin-wall structures.

16. The solar LED indicator of claim 7, wherein the base and the lamp holder are symmetrically integrated thin-wall structures.

17. The solar LED indicator of claim 8, wherein the base and the lamp holder are symmetrically integrated thin-wall structures.

* * * * *